April 7, 1925.
O. C. WINESTOCK
VEHICLE SPRING
Filed Jan. 31, 1924
1,532,565
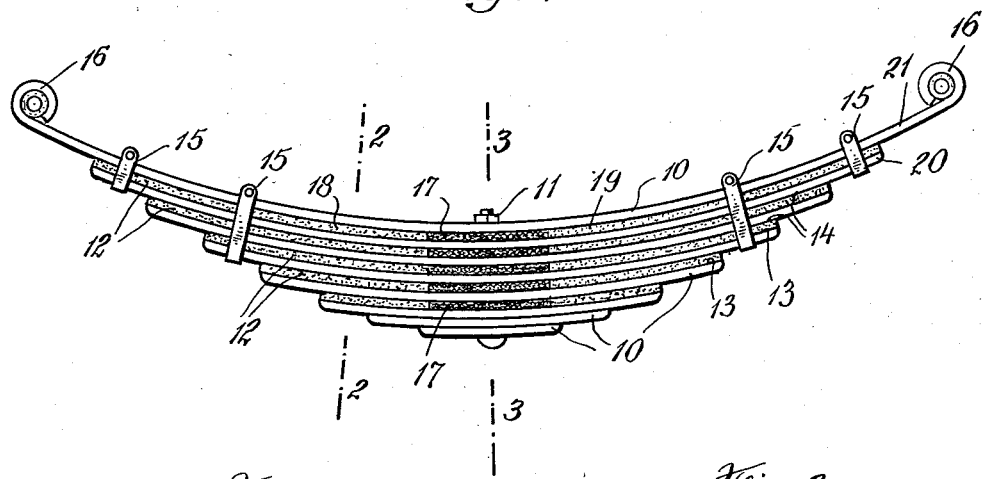
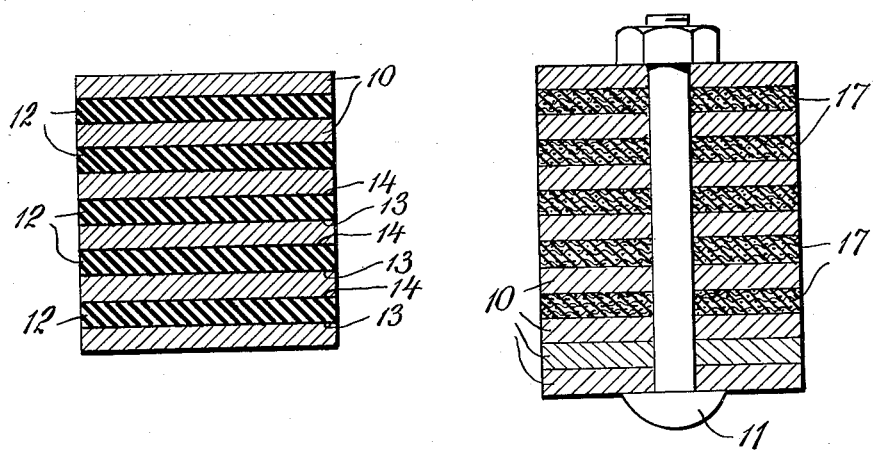
INVENTOR
O. C. Winestock
BY
Pennie, Davis, Marvin & Edmonds
his ATTORNEYS Patented Apr. 7, 1925.

1,532,565

UNITED STATES PATENT OFFICE.

OTTO CHARLES WINESTOCK, OF PERKINSVILLE, VERMONT.

VEHICLE SPRING.

Application filed January 31, 1924. Serial No. 689,622.

*To all whom it may concern:*

Be it known that I, OTTO CHARLES WINE-STOCK, a citizen of the United States, residing at Perkinsville, in the county of Windsor, State of Vermont, have invented certain new and useful Improvements in Vehicle Springs; and I do hereby declare the following to be a full, clear, and exact description of the invention, such as will enable others skilled in the art to which it appertains to make and use the same.

This invention relates to vehicle springs, and has particular relation to springs for automotive vehicles. The object of the invention being the provision of an improved vehicle spring.

Vehicle springs are ordinarily of the plate type and comprise a plurality of superposed leaves, usually of varying length, of steel or other suitable spring material. These leaves are clamped together in an appropriate manner with the surfaces of adjacent leaves in contact with one another so as to distribute the load uniformly. When the spring is deflected by applying a load or by varying the load which the spring is carrying these leaves are forced to slide longitudinally upon one another. This relative motion of the leaves with respect to each other is comparatively small in magnitude but results in a relatively great amount of friction which interferes with the proper action of the device as a spring.

Such friction between the leaves of an automobile spring, for example, has heretofore necessitated the lubrication, at least to some degree, of the surfaces of the various leaves. It is difficult to accomplish proper lubrication of plate springs of this character and consequently the flexibility of the springs is impaired to such an extent as to interfere with the riding qualities of the car. Furthermore when the lubricant is allowed to work out of a spring there is eventually probably an uneven distribution of the stress in the various leaves, which not infrequently eventuates in a breakage of the spring. Additional objections to the use of springs which require lubrication are, a tendency to become noisy, the collection of dust by the lubricant which exudes from between the leaves, and the necessity of periodically lubricating the springs, which in itself is laborious and expensive. Many ingenious devices have been proposed either for introducing liquid or paste lubricant such as graphite between the leaves of springs, or for securing continuous lubrication of the surfaces of the leaves by means of strips of material having lubricating characteristics placed between the leaves.

The present invention aims to obviate many of the above mentioned disadvantages and in accordance with this invention a separator comprising a strip of rubber or the like is placed between the adjacent leaves of plate springs or the like. The rubber separating strips are merely laid between the leaves of the spring. The strips are therefore unattached to the spring leaves, but are held in place by the clamping means ordinarily employed for securing the leaves together and to the vehicle upon which the spring is mounted, the longer strips also being held in place by the spring clips used for holding together the outer ends of the spring leaves.

These separating strips do not afford a means of lubricating the surfaces of the spring leaves, but because of their resiliency they absorb by stretching and compression the relative motion of the leaves as the spring is deflected. It is usually sufficient to employ these separators between only those leaves of the spring which are subjected to appreciable movement. By this is meant that in an ordinary semielliptic automobile spring, for instance, it is not usually necessary to put separators between the two or three relatively short spring leaves at the bottom of the spring.

The invention will be better understood by referring to the accompanying drawings illustrating, by way of example, what I now consider to be the best embodiment of the invention. In these drawings Fig. 1 is a view in side elevation of a semielliptic plate spring of a type commonly used in automobiles; Fig. 2 is a view in transverse section taken on the line 2—2 of Fig. 1, and Fig. 3 is a view also taken in transverse section taken on the line 3—3 of Fig. 1.

Referring to the accompanying drawings, the plate spring here shown is built up of a plurality of leaves 10 of spring steel which are clamped together by means of the bolt 11, by which means the spring may also be secured to the axle of the vehicle through the instrumentality of suitable clamps. The leaves 10 are of progressively increasing lengths from the bottom to the top of the spring, as is customary. Between a plurality of these leaves 10 there are placed the separators or separating strips 12 of rubber. The separators 12 may, if desired, be placed between each of the leaves 10, but I have found that sufficiently good results are obtained by utilizing them only between such leaves as are subject to relatively large relative motion during the flexing of the spring. Hence, as shown, the separating strips are omitted from between the lowest three leaves 10.

My investigations have shown that it is unnecessary to secure together the lower contact surfaces 13 or the upper contact surfaces 14 between the separating strips and the spring leaves by the use of adhesives or in any other manner whatever, but that it is entirely satisfactory to merely lay the separators between the spring leaves. The relatively short separating strips are, however, held in place against lateral movement by the clamping bolt 11 and the clamping means supplementary thereto by which the spring is usually secured to the vehicle axle. Also the longer separating strips are effectively held against displacement by the metallic clips 15, which are customarily used to hold the spring leaves in place. The outer ends 16 of the spring are secured to the vehicle frame by shackles or other suitable connecting means.

I preferably construct these separating strips 12 with portions having relatively different resiliencies, and as shown in Figs. 1 and 3, the central portion 17 of each of the separators is made of a relatively non-resilient material such, for example, as fabric, on either side of which there is vulcanized the relatively highly resilient portions 18 and 19 of rubber. In this way the initial pressure under which the spring leaves are clamped is taken by the relatively non-resilient portion 17 without placing the active portions 18 and 19 under an undesirable initial compression. The active portions are then enabled most effectively to perform their functions of allowing the relative motion between the spring leaves to be absorbed by stretching and compression within them.

This relative motion takes place in the following manner. When there is a change of load upon the ends 16 of the spring causing these ends to move either upwardly or downwardly with respect to the center of the spring, a longitudinal relative motion occurs between each of the leaves 10 of the spring as they are bent either one way or the other. Thus, for example, the outer end 20 of the next to the top leaf will move slightly with respect to the surface of the top leaf 21. In an ordinary spring this second leaf would slide upon the under surface of leaf 21. In the improved spring the same amount of motion takes place but the sliding does not take place, and instead the upper and lower surfaces of the separating strip 12 between these two leaves are caused to shift relatively to one another by an amount which is substantially equal to the relative motion between the end 20 and the leaf 21. The weight upon the spring will cause the separating strip to be stretched or elongated and compressed by an amount equal to the relative movement between the adjacent leaves.

The resistance to this movement can be varied by varying the quality of the rubber or other material employed in the active portions 18 and 19 of the strips 12, or by varying the thickness of the strips, but I have found that soft rubber strips of substantially less than one-half the thickness of the spring leaves operate quite satisfactorily.

In a test of automobile springs constructed in accordance with the invention, extending over many months and under particularly trying conditions, I have found that the soft rubber separating strips do not show any apparent wear, indicating that a life of these strips substantially equal to the life of an ordinary automobile can in all probability be depended upon. Although merely laid between the leaves of the spring the separating strips have shown no tendency to slide out sidewise and the springs have given remarkable operation in every respect.

By constructing vehicle springs in accordance with my present invention the flexibility of the springs is materially increased, thus giving better riding qualities to the car upon which they are placed. The liability of spring breakage is greatly reduced, or even entirely eliminated because of the even distribution of stress within the various leaves of the spring at all times. No squeak or other spring noise resulting from lack of lubrication is possible. The necessity of periodically lubricating the spring is entirely eliminated and the rubber separators will probably last as long as the vehicle upon which they are placed will last. At all events a single renewal of the separators during the life of the vehicle will be quite sufficient. Moreover, the springs thus constructed have a tendency to remain in a relatively clean condition inasmuch as there is no lubricant present upon them to collect dust. In addition I have found that springs thus constructed have less tendency to rebound than the ordinary lubricated spring, and I attribute this characteristic to the restoring force exerted by the tension in the separating strips which is present as soon as the leaves of the spring have overshot or rebounded. This reduction in tendency to rebound is a material factor in improving the riding qualities of the vehicle, and is also a factor in preventing spring breakage.

I claim:

A vehicle spring comprising a plurality of spring leaves and a series of unattached rubber strips inserted therebetween.

In testimony whereof I affix my signature.

OTTO CHARLES WINESTOCK.